Aug. 4, 1959

T. A. BILLINGS 2,897,614

LAND CLEARING RAKE

Filed Oct. 11, 1957

INVENTOR
Thomas A. Billings
BY Mason, Fenwick & Lawrence
ATTORNEYS

Aug. 4, 1959 T. A. BILLINGS 2,897,614
LAND CLEARING RAKE
Filed Oct. 11, 1957 2 Sheets-Sheet 2
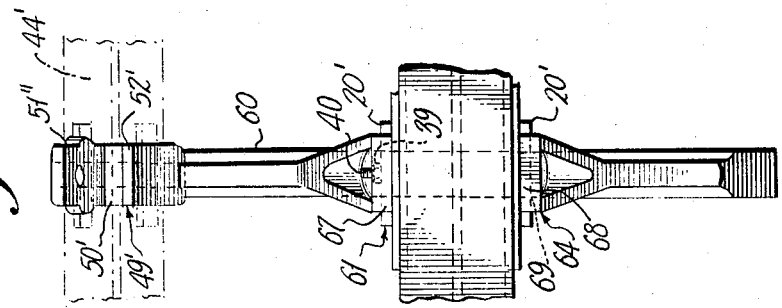
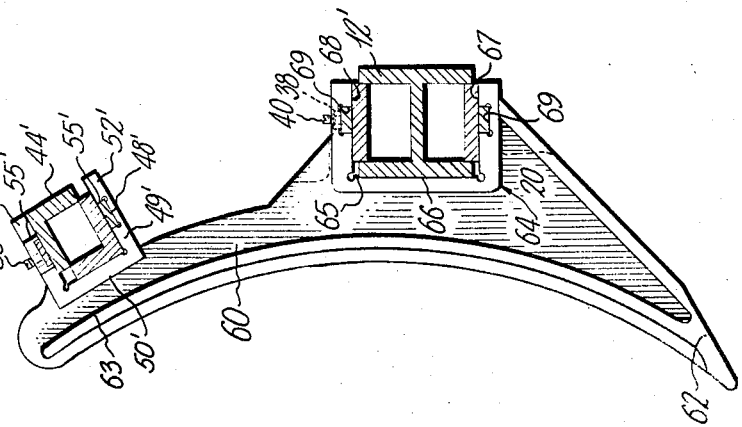
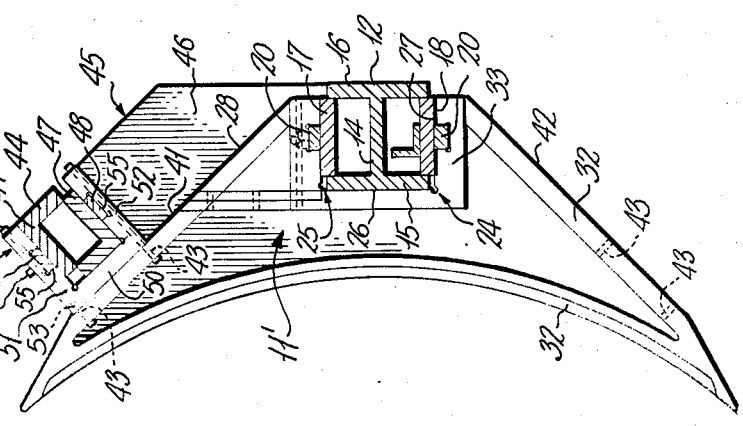
INVENTOR
Thomas A. Billings
BY Mason, Fenwick & Lawrence
ATTORNEYS

United States Patent Office 2,897,614
Patented Aug. 4, 1959

2,897,614

LAND CLEARING RAKE

Thomas A. Billings, Orlando, Fla.

Application October 11, 1957, Serial No. 689,596

8 Claims. (Cl. 37—145)

The present invention relates in general to accessory equipment for earth moving equipment such as bulldozers and the like, and more particularly to heavy duty land clearing rakes.

Heretofore, a number of accessory blades or rakes of various types have been provided for attachment on heavy duty earth moving tractors and the like to facilitate clearing of land in large land-clearing projects. One type of land-clearing accessory which has come into wide use is a rake unit comprising a number of vertically arranged narrow blades or rake teeth mounted on a transverse beam which is fixed to tractor pusher arms to position the unit forwardly of the tractor. In operation, the rake teeth are adapted to extend below the normal level of a bulldozer blade to dig into and loosen hard or rocky soil, uproot stumps or rocks, or the like.

Such rake units have heretofore been manufactured by rigidly mounting the tooth castings on the transverse rake frame at fixed spaced positions along the frame. This has produced considerable difficulty in the use of such attachments, as the inability of the teeth to move relative to each other and to the mounting frame causes a high incidence of tooth breakage. Of more importance is the fact that tree stumps or deeply embedded rocks having a diameter only slightly larger than the spacing between successive rake teeth frequently become jammed tightly between the rake teeth. It is extremely difficult to remove such debris from between the teeth. It is often necessary to forcibly pull the debris from between the teeth by attaching a chain or cable at one end to the debris jammed in the rake and at the other end to an immovable object such as a large tree, and operating the earth moving equipment in a direction away from the fixed anchoring facility. This procedure becomes extremely difficult in locations where only one tractor is working and no large fixed natural objects are available to provide an anchoring facility. In the case where tree stumps become wedged between the rake teeth, it may be necessary to resort to an axe to chop it out of the rake unit. In any case, much time which would otherwise be available for profitable use of the earth moving equipment is wasted in dislodging the debris from the rake unit.

Additionally, the toe portions of the rake teeth which dig into the ground are subject to severe wear and require periodic replacement or repair. The rigid mounting of the tooth castings in many types of rake frame makes the replacement of the teeth a complex and time-consuming procedure.

An object of the present invention, therefore, is the provision of a novel rake construction for attachment to tractors and the like wherein limited tilting movement of the teeth is afforded to facilitate dislodgment of debris from between the teeth.

Another object of the present invention is the provision of a novel land clearing rake construction having adjustable and readily replaceable heavy duty teeth.

Another object of the present invention is the provision of a novel land clearing rake construction wherein the coupling of the rake teeth to the transverse rake frame members facilitates ready adjustment of the tooth spacing to dislodge debris and inversion of the teeth.

Other objects, advantages and capabilities of the present invention will become apparent from the following detailed description, taken in conjunction with the accompanying drawings showing preferred embodiments of the invention.

In the drawings:

Figure 4 is a side elevation of a modified form of rake tooth adapted for attachment to a rake frame having main and top beams, the beams being shown in section;

Figure 5 is a side elevation of another modified form of rake tooth; and

Figure 6 is a rear elevation of the rake tooth shown in Figure 5.

Figure 1:
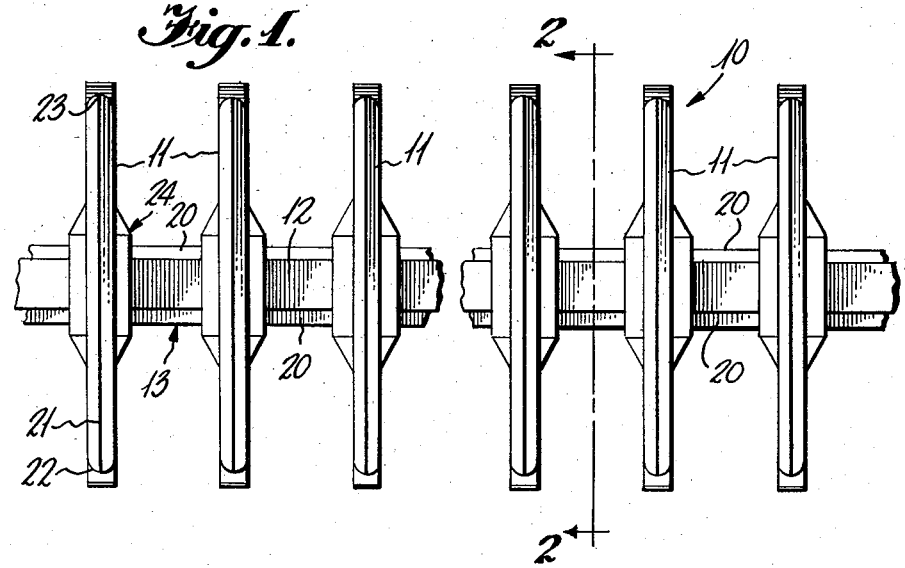
Figure 1 is a front elevation of a land clearing rake embodying one form of the present invention.

Referring to the drawings wherein like reference characters designate corresponding parts throughout the several figures, the land clearing rake is generally designated by the reference character 10 and comprises a large number of identical rake teeth 11 arranged in parallel vertical planes in side-by-side relation on a main beam 12 of a rake frame 13. In the particular form shown in Figure 1, the rake frame takes the form of a single main beam which is adapted to be supported on the push-arms of a tractor or bulldozer or the like with the rake 10 extending transversely of the tractor and located in front of the tractor. The main beam 12 must be of a construction which is flexible in bending movement and will return to normal position when relieved of working pressure. To provide these characteristics, the main beam is of boxed wide-flange beam construction formed of a wide flange beam having horizontal web 14 and vertical flanges 15 and 16, and top and bottom plates 17, 18, welded at their lateral edges to the ends of the flanges 15, 16 to form a box-shaped outline. An angle brace 19 may be welded to the inner surface of the bottom plate 18 and lie between the web 14 and plate 18 to further strengthen the main beam 12. Slide rails 20 are welded to the exposed faces of the top and bottom plates 17, 18, in vertical alignment with each other.

The teeth 11 are identical to each other in construction, so that a detailed description of one will suffice for an adequate understanding of the invention. The tooth 11 is a casting having a concave front face 21 and forwardly curving toes 22 and 23 at the lower and upper ends of the tooth. The rear edges of the toe portions 22, 23, preferably angle rearwardly along rectilinear converging paths to a mounting yoke 24 having a rearwardly opening recess 25 adapted to receive the main beam 12. The recess 25 is bounded by a base wall 26 and a lower side wall 27 formed integrally with the teeth. A removable right triangular shaped bracket 28 is removably coupled to the tooth body and has a base portion 29 which forms the upper side of the recess 25. This bracket 28 has side portion 30 extending at right angles to the base portion 29 adapted to fit flat against a mounting surface 31 of the tooth body which faces rearwardly and lies above the recess 25 in a plane spaced just forward of the base 26 of the recess 25. The tooth casting is provided with peripheral flanges 32 to reinforce it, in accordance with conventional practice, and the base 26 and sides 27 and 29 are provided with laterally enlarged flanges 33 to increase the lateral extent of the surfaces bearing on the main beam 12. The flanges 33 extend upwardly along the mounting surface 31 to increase the area of the surface and the side portion 30 of the bracket 28 is shaped to conform thereto. Suitable bolt holes 34 are formed in the portion of the flange 33 bonding the mounting surface 31 and in the bracket 28 to accommodate bolts 35 for affixing the bracket 28 on the tooth body.

The facing surfaces of the side 27 and base portion 29 of the bracket 28 are provided with transverse grooves 36 for receiving the slide rails 20 on the main beam. Additionally, the bracket 28 is relieved above the base portion 29 as indicated at 37 and a hole 38 extends vertically through the base portion 29 from the slide groove 36 to the relieved area 37. The hole 38 is enlarged at its lower end adjacent the groove 36 to accommodate a lock nut 39 and conforms to the configuration of the nut, and is designed to receive a lock bolt 40 threaded through the lock nut 39 to bear on the upper slide rail 20 for locking the tooth 11 at the desired position of adjustment on the beam 12.

This construction incorporates several features which make for most effective working conditions. It facilitates adjustment of the lateral spacing of the teeth 11 along the main beam 12 so that the tooth adjustment can be readily made to suit the particular job the contractor wishes to do. The tooth 11 is held on the main beam 12 against tilting relative to the vertical axis and at the desired position of attack by the interaction of the slide rails 20 and the grooves 36 in the side 27 and base portion 29 in which the rails are seated. The teeth 11 may be slid laterally along the slide rails 20 to the desired relative position and spacing, and the lock bolt 40 then tightened against the upper slide rail 20 to hold the teeth in position.

The arrangement is also designed so that the tooth 11 may be readily removed from the main beam 12 in the field and reassembled with the beam in inverted relation when one of the toes 22, 23, has become worn. This is accomplished simply by removing the bolts 35 from the bolt holes 34, by which the removable bracket 28 is fixed to the tooth body. This frees the bracket 28 for removal from the tooth body and removal of the tooth 11 from the main beam 12. The tooth 11 is then inverted, the slide groove 36 in the side 27 of the recess 25 fitted over the slide rail 20 on the upper plate 17 of the main beam 12, the bracket 28 returned to proper alignment with the mounting surface 31 of the tooth 11 with the slide groove 36 in the base portion 29 thereof fitted over the other slide rail 20, and the bolts 35 then fitted in the bolt holes 34. The tooth is then adjusted laterally along the main beam 12 to its proper position and the lock bolt 40 tightened to lock the tooth 11 in this position.

A limited amount of clearance is provided between the slide grooves 35 and the slide rails 20, and between the surfaces of the recess 25 and the main beam 12 so that each tooth 11 can swing laterally to a limited extent about its coupling axis with the main beam 12, which axis extends vertically substantially through the centers of the slide rails 20. Thus, if a pair of adjacent teeth 11 of the rack 10 become jammed over a large stump or boulder, each tooth 11 may be swung slightly laterally about its coupling axis with the main beam 12. Since the toes 22, 23 of the teeth 11 project forwardly of this coupling axis, this limited lateral movement of the teeth 11 allows a larger opening at the toes of the tooth than at the main beam. In many cases, this degree of movement of the toe will be sufficient to allow the debris to drop out by its own weight. However, if the jamming of the debris between the teeth 11 is so severe that the debris will not fall out by its own weight, then all that is necessary to effect release of the debris is to loosen the lock bolt 40 on one of the teeth 11 which is jammed and slide the tooth laterally along the main beam 12 and slide rails 20 until the debris is free. In this way, the time-consuming procedure of coupling a chain to a fixed natural object and to the debris and backing the tractor away from the fixed object is avoided.

In some land clearing projects, extra heavy clearing rakes may be required which employ a center main beam and a top beam for supporting the rake teeth. In such cases, the desirable properties of the embodiment disclosed in Figures 1, 2 and 3 may be preserved by the rake tooth construction illustrated in Figure 4. This form of rake tooth, which is indicated generally by the reference character 11' has the same mounting yoke construction 24 which is described in the embodiment of Figures 1–3. Additionally, the flanged, rearwardly converging edges of the tooth 11', indicated by the reference characters 41 and 42 are provided with bolt holes 43 spaced from the recess 25 a distance corresponding to the spacing between the main beam 12 and a top beam 44 of the rake frame, indicated by the reference character 45. In this form of rake frame 45, the main beam 12 and the top beam 44 are supported in fixed spaced relation by end plates, as indicated at 46, welded thereto, in accordance with conventional construction practice, and the top beam 44 is preferably formed of boxed angle beams comprising a pair of angle iron members 47 welded together at the edges of their flanges to provide a substantially rectangular cross section. The top beam 44 is also provided with upper and lower slide rails 48 arranged in alignment with each other in a plane perpendicular to the planes of the angle iron flanges to which they are secured. A removable channel shaped bracket 49 having a web portion 50 and flanges 51 and 52 is adapted to be removably secured to either the toe portion 22 or toe portion 23 of the tooth 11'. The flanges 51, 52 of the channel shaped bracket 49 are provided with bolt holes 53 extending therethrough and positioned to register with the bolt holes 43 in the flanges of the edges 41, 42 of the tooth 11' to receive bolts 54 for mounting the channel shaped bracket 50 to the upwardly projecting portion of the tooth 11'. The facing surfaces of the flanges 51, 52 of the channel shaped bracket 50 are provided with slide grooves 55 for accommodating the slide rails 48. Flange 51 of the channel shaped bracket 50 is also provided with a hole 38 extending therethrough and communicating with the slide groove 55 therein, to receive a lock nut 39 and lock bolt 40 identical in construction to those described in connection with the embodiment of Figures 1–3.

It will be understood that the tooth 11' will be readily adjustable laterally along the main beam 12 and top beam 44 in a manner similar to that previously described and may be easily removable from the rake frame 45 in a similar manner. It also may be readily inverted in the field when the downwardly projecting toe 22 or 23 becomes worn, as the channel shaped bracket 49 may be removed from the upwardly projecting toe portion of the tooth 11' and, following inversion of the tooth, be coupled to the toe portion which then projects upwardly.

Figure 2:
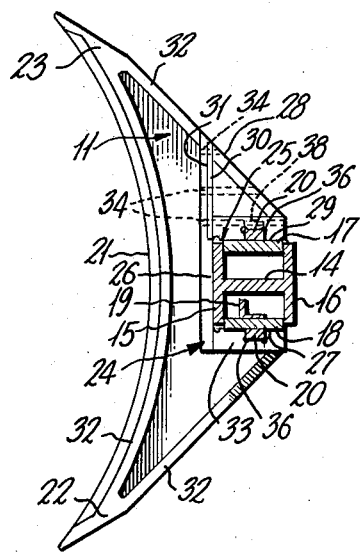
Figure 2 is a vertical section taken on the line 2—2 of Figure 1.
Figure 3:
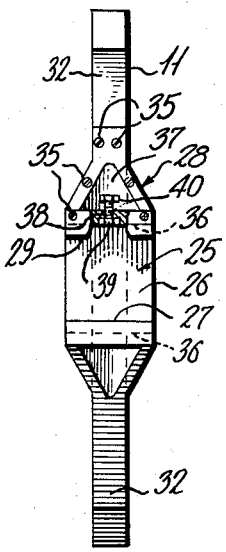
Figure 3 is a rear elevation of one of the rake teeth.

The top side 51 of the bracket 49 is provided with a lock bolt assembly 56 which is identical to the lock bolt 40 and nut 39 described in connection with Figures 1–3, to be adjusted tightly against the adjacent slide rail 48 and hold the bracket 49 against lateral displacement relative to the rail 48.

Another form of rake tooth, indicated by the reference character 60, is shown in Figures 5 and 6 for use with rake frames having a main beam 12' and a top beam 44' of slightly modified construction. The main beam 12' and top beam 44' are a boxed wide-flange beam and a boxed angle beam, respectively, of the type shown in Figure 4, except that the slide rails 20' in this modification are interrupted a point or several points intermediate the ends of the beams 12' and 44'. The width of the interruption, indicated at 61, is sufficient to permit the portion of the rake teeth 60 to be coupled to the beams to pass between the ends of the slide rails 20' bounding the interruption 61.

The rake tooth 60 differs from the tooth 11' in that the tooth 60 has a toe 62 at the lower end thereof and an upwardly projecting leg 63 which is not sharpened to form a digging toe. A mounting yoke 64 generally similar in shape to the yoke 24 is provided, having a recess 65 for accommodating the main beam 12' bounded by a base 66, a lower side 67, and an upper side 68 which is integrally cast with the tooth 60. The sides 67 and 68 are provided with slide grooves 69 to accommodate the slide rails 20', and the upper side member 68 is provided with a hole 38 accommodating a lock nut 39 and lock bolt 40 as described in connection with Figures 1-3.

The upwardly projecting leg 63 has integrally cast therewith a channel-shaped bracket 49' which is identical in construction to bracket 49 but does not have the mounting bolts 54 in holes 53 therefor. The bracket 49' has a web 50' and parallel sides 51', 52' which are provided with grooves 55' to receive slide rails 48 on the top beam 44', and a lock bolt assembly 56' similar to lock bolt assembly 56 is provided in the side 51' to set the bracket 49' against lateral displacement relative to the adjacent rail 48'. The slide rails 48' are interrupted similarly to the rails 20' to accommodate the width of the sides 51', 52' of the bracket 50'.

The teeth 60 may be readily removed from the beams 12' and 44' by loosening the lock nut assemblies 56' and lock bolt 40, sliding the teeth 60 along the rails 20', 48' of the beams until the bracket 49' and yoke 24' register with interruptions in the rails 20', 48', and withdrawing the teeth forwardly of the beams. Full lateral adjustability and addition or subtraction of teeth to meet the requirements of a particular job are then afforded. The slide grooves 69 and 55' are proportioned relative to the slide rails to provide a limited amount of clearance so as to permit limited tilting movement of the teeth 60 about their coupling axes and facilitate dislodgment of debris. The modification has the same advantageous features characterizing the other two embodiments, except that the teeth may not be inverted.

While several preferred and practical embodiments of the invention have been disclosed in the above description, it will be understood by those skilled in the art that the disclosure represents exemplary embodiments and that other arrangements of parts cooperable to carry out the inventive concept are to be regarded as within the purview of the invention.

What is claimed is:

1. A land clearing rake comprising a horizontal cross beam having a front wall and parallel upper and lower walls, said upper and lower walls having rails thereon projecting oppositely therefrom and extending along said cross beam, a plurality of rake teeth each having a mounting yoke removably supporting said teeth in parallel vertical planes for sliding lateral adjustment on said cross beam, said mounting yoke including a pair of vertically spaced leg portions having parallel surfaces and an interconnecting base surface defining a rearwardly opening channel shaped recess spaced to closely fit said cross beam walls, the surfaces of said leg portions having transverse grooves therein for slidably receiving said rails and being dimensioned to permit slight tilting of said teeth about a vertical axis through said yoke, and threaded adjustable means in one of said leg portions projectable into contact with said beam for frictionally locking the associated tooth in a desired position of adjustment along said cross beam.

2. A land clearing rake comprising a horizontal cross beam having a vertical front wall and horizontal upper and lower walls, said upper and lower walls having rails thereon projecting oppositely therefrom and extending along said cross beam, a plurality of rake teeth each having a mounting yoke removably supporting said teeth for sliding lateral adjustment on said cross beam, said mounting yoke including a pair of vertically spaced leg portions having horizontal surfaces and an interconnecting base surface defining a rearwardly opening channel shaped recess spaced to closely fit said cross beam walls, the surfaces of said leg portions having transverse grooves therein for slidably receiving said rails and being dimensioned to permit slight tilting of said teeth about a vertical axis through said yoke, one of said leg portions of said mounting yoke being removably coupled to its associated tooth forwardly of the transverse groove therein, and lock bolt means threaded in one of said leg portions and projectable into contact with said cross beam for frictionally locking the associated tooth in the desired position of adjustment along said cross beam.

3. A land clearing rake comprising a horizontal cross beam of rectangular cross section having horizontal top and bottom walls including a rib like rail on each of said top and bottom walls projecting perpendicular thereto in a vertical plane paralleling the longitudinal axis of the cross beam, a plurality of rake teeth supported in parallel, laterally spaced, vertical planes along said cross beam, each of said teeth having an arcuate cutting face projecting forwardly of the cross beam and a mounting yoke located intermediate the upper and lower ends of said cutting face, said mounting yoke including a vertical surface and a pair of leg portions projecting rearwardly therefrom having inwardly facing, transversely grooved, horizontal surfaces defining a rearwardly opening channel shaped recess and spaced to closely fit the top and bottom walls of said cross beam and said rails and hold the tooth against withdrawal from the cross beam in a direction perpendicular to the axis of the cross beam, said grooved surfaces having a sliding fit with said cross beam and said rails and being dimensioned to permit slight tilting of said teeth about a vertical axis through their associated yokes, and adjustable lock bolt means threaded through one of said leg portions into contact with the adjacent one of said rails for frictionally locking said tooth in desired position of adjustment along said cross beam.

4. A land clearing rake comprising a horizontal cross beam of rectangular cross section having horizontal top and bottom walls including a rib like rail on each of said top and bottom walls projecting perpendicular thereto in a vertical plane paralleling the longitudinal axis of the cross beam, a plurality of rake teeth supported in parallel, laterally spaced, vertical planes along said cross beam, each of said teeth having an arcuate cutting face projecting forwardly of the cross beam and a mounting yoke located intermediate the upper and lower ends of said cutting face, said mounting yoke including a vertical surface and a pair of leg portions projecting rearwardly therefrom having inwardly facing, transversely grooved, horizontal surfaces defining a rearwardly opening channel shaped recess and spaced to closely fit the top and bottom walls of said cross beam and said rails and hold the tooth against withdrawal from the cross beam in a direction perpendicular to the axis of the cross beam, said grooved surfaces having a sliding fit with said cross beam and said rails and being dimensioned to permit slight tilting of said teeth about a vertical axis through their associated yokes, one of said leg portions being removable from its associated tooth along a plane of separation forming substantially a vertical extension of said vertical surface of said yoke, bolt means for securing said removable leg portion to said tooth, and adjustable lock bolt means threaded through one of said leg portions into contact with the adjacent one of said rails for frictionally locking said tooth in desired position of adjustment along said cross beam.

5. A land clearing rake comprising an elongated horizontal cross beam of rectangular cross-section having horizontal top and bottom walls and a rail extending along each of said walls and projecting perpendicularly therefrom, a plurality of rake teeth supported in parallel, laterally spaced, vertical planes along said cross beam, each of said teeth being formed of a cast tooth body having a forwardly facing concave cutting face terminating at its upper and lower ends in digging toes and inclined rear edges converging rearward toward the medial portion of the tooth body to a mounting portion, said mounting portion including a substantially L-shaped recess bounded by a vertical surface having a first portion adapted to abut the front surface of said cross beam and a second portion extending above said first surface portion and a horizontal surface extending perpendicular to said base surface for abutting one of said cross beam walls, a removable bracket having a flat face coextensive with said second vertical surface portion to be mounted in abutment therewith and a face normal thereto to extend in parallelism with said horizontal surface of said mounting portion to abut the other of said cross beam walls, means for removably securing said bracket to said tooth body with said flat face and said first vertical surface portion in coextensive abutment, said horizontal surface and said normal face of said bracket each having a transverse groove therein having a sliding fit with said rails, and adjustable threaded means extending through said bracket into contact with the adjacent rail for frictionally locking the associated tooth against lateral displacement along said cross beam.

6. A land clearing rake comprising a horizontal cross beam having a front wall and parallel upper and lower walls, said upper and lower walls having rails thereon projecting oppositely therefrom and extending along said cross beam, a plurality of rake teeth each having a mounting yoke removably supporting said teeth in parallel vertical planes for sliding lateral adjustment on said cross beam, said mounting yoke including a pair of vertically spaced leg portions having parallel surfaces and an interconnecting base surface defining a rearwardly opening channel shaped recess spaced to closely fit said cross beam walls, the surfaces of said leg portions having transverse grooves therein for slidably receiving said rails and being dimensioned to permit slight tilting of said teeth about a vertical axis through said yoke, one of said leg portions including threaded adjustable means including an abutment projectable into contact with said beam for frictionally locking the associated tooth in a desired position of adjustment along said cross beam.

7. In a land clearing rake, the combination recited in claim 6, wherein said rake includes a top beam extending parallel to said cross beam and spaced vertically from the same having oppositely projecting elongated rib-like rails on a pair of opposite surfaces thereof, a channel shaped bracket on each of said teeth spaced above the mounting yoke thereon in correspondence with the spacing between said cross beam and said top beam and opening toward said top beam, said channel shaped bracket having spaced sides including grooves therein for closely fitting the surfaces of said top beam, said grooves having a sliding fit with their associated rails and being dimensioned to permit slight tilting of said teeth about a vertical axis through their mounting yokes, and threaded adjustable means in one of said channel sides projectable into contact with said top beam for frictionally locking the associated teeth in a desired position of adjustment along said beams.

8. In a land clearing rake, the combination recited in claim 3 wherein said rake includes a top beam extending parallel to said cross beam and spaced vertically from the same having oppositely projecting elongated rib-like rails on a pair of opposite surfaces thereof, said rake teeth being invertable and the cutting faces thereof terminating in digging toes at the upper and lower ends thereof, a channel shaped bracket for each of said teeth having a flat web removably secured to the associated teeth spaced above the mounting yoke associated therewith in correspondence with the spacing between said cross beam and said top beam, said bracket opening toward said top beam and having spaced channel sides for closely fitting the surfaces of said top beam and including transverse grooves therein, said grooves having a sliding fit with their associated rails and being dimensioned to permit slight tilting of said teeth about a vertical axis through their associated mounting yokes, said teeth having rearwardly facing mounting surfaces adjacent the upper and lower ends thereof forming abutment surfaces for said channel bracket web, and adjustable threaded means extending through one of the channel sides of each bracket into contact with said top beam for frictionally locking the teeth in desired positions of adjustment along said beams.

References Cited in the file of this patent

UNITED STATES PATENTS

| 2,491,058 | Peacock et al. | Dec. 13, 1949 |
| 2,491,208 | Price et al. | Dec. 13, 1949 |

FOREIGN PATENTS

| 151,678 | Australia | June 1, 1953 |